3,413,366
CHLORINATION OF BUTADIENE
Howard Emil Holmquist, Wilmington, Del., assignor to E. I. du Pont de Nemours and Company, Wilmington, Del., a corporation of Delaware
No Drawing. Filed Oct. 23, 1965, Ser. No. 504,166
4 Claims. (Cl. 260—655)

ABSTRACT OF THE DISCLOSURE

Process for preparing 1-chloro-1,3-butadiene from butadiene in a single step in which process butadiene is contacted and reacted with cupric chloride in the presence of an inert, organic diluent which is liquid under reaction conditions, said cupric chloride being the sole reactive chlorine-yielding agent, substantially pure 1-chloro-1,3-butadiene being recovered from the resulting reaction mixture.

---

No simple method has been known for the preparation of substantially pure 1-chloro-1,3-butadiene. Methods previously known have yielded mixtures of compounds in which 1-chloro-1,3-butadiene has been one component.

The reaction of 1,3-butadiene with cupric chloride supported on pumice in the temperature range of 220–330° C. has been described by R. P. Arganbright and W. F. Yates in Journal of Organic Chemistry, volume 27, pages 1205–1208 (1962). In this reaction the products consisted of 98 mole percent of various dichloro-1-butenes and only 2 mole percent of 1-chloro-1,3-butadiene. U.S. Patent 2,399,488 discloses that it is known that olefins such as ethylene, propylene, butylenes and the like (including butadiene) may be chlorinated to addition products by reacting the olefins with chlorides of metals possessing variable valences, such as cupric chloride. The metal chloride is preferably disposed on a carrier such as asbestos, pumice, or clay. The process of the patent uses an "activated alumina" as the substrate for the metal chloride.

The present invention is a simple process for the production of 1-chloro-1,3-butadiene from butadiene in a single step. In its broadest definition, this invention is a process for the preparation of 1-chloro-1,3-butadiene which comprises contacting and reacting butadiene and cupric chloride in the presence of an inert organic diluent which is liquid under reaction conditions, under essentially anhydrous conditions, at a temperature in the range of about 100° C. to about 265° C., and recovering 1-chloro-1,3-butadiene from the reaction mixture, with the proviso that the said cupric chloride is the sole reactive chlorine-yielding agent.

The requirements for the organic reaction medium to be used in the process of this invention are as follows:
(1) It must be liquid under the reaction conditions.
(2) It must be relatively inert to the reaction with cupric chloride and by-products of the reaction.

It is preferred that the liquid dissolve the cupric chloride and thus form a solvent medium for the reaction. However, the liquid may serve only as a suspending medium for the cupric chloride. For convenience the liquid reaction medium will hereafter be referred to as the "solvent."

The preferred solvents for the reaction are the N,N-dialkyl aliphatic carboxylic acid amides and N-alkyllactams containing 5 to 7 members in the ring. The cupric chloride is soluble in these solvents. The N,N-dialkyl aliphatic carboxylic acid amides may be represented by the formula:

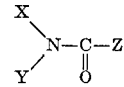

wherein X, Y, and Z may each be a lower alkyl group containing one to four carbon atoms and where Z may also be hydrogen. This same formula may also include the N-alkyl lactams when X and Z together form an alkylene radical containing three to five carbon atoms.

Examples include N,N-dimethylformamide, N,N-dimethylacetamide, N,N-diethylformamide, N,N-dimethylbutyramide, N,N - diethylpropionamide, N,N - dipropylacetamide, N,N-dipropylpropionamide, N,N-dibutylformamide, N,N-dibutylbutyramide, N-ethyl-N-methylacetamide, N,N-dimethylisovaleramide, 1-methyl-2-pyrrolidone, 1-isopropyl-2-pyrrolidone, 1-ethyl-2-piperidone, 1-butyl-2-pyrrolidone, and N-methylcaprolactam. Of these, N,N-dimethylformamide is especially preferred because of its excellent solvent power and its ready availability.

Also suitable but less desirable solvents in which the cupric chloride is soluble include solvents of the following types:

(a) The amides of the above formula in which one or both of X and Y may be hydrogen and the above-defined lactams in which Y is hydrogen. Examples of these include formamide, acetamide, propionamide, butyramide, isobutyramide, valeramide, N-ethylformamide, N-butylacetamide, N-butylbutyramide, N-propylbutyramide, 2-pyrrolidone, 2-piperidone and caprolactam.

(b) Lower dialkyl sulfones and sulfoxides in which each alkyl group may contain one to four carbon atoms and cyclic alkylene sulfones containing five or six members in the ring. Examples includes dimethyl sulfone, dimethyl sulfoxide, diethyl sulfone, diethyl sulfoxide, dibutyl sulfone, dibutyl sulfoxide, tetramethylene sulfone and pentamethylene sulfone.

(c) Hexaalkyl phosphoric triamides in which each alkyl group may contain one to four carbon atoms. Examples include hexamethyl phopshoric triamide, hexaethyl phosphoric triamide, hexapropyl phosphoric triamide, and hexabutyl phosphoric triamide.

Examples of other solvents which may be used but in which the cupric chloride is either insoluble or only slightly soluble include chlorinated aromatic hydrocarbons, mineral oils having a specific gravity of about 0.828 to about 0.905, predominantly chlorinated olefins which are liquid under the reaction conditions, such as tetrachloroethylene, and aromatic carbonitriles such as benzonitrile. Examples of chlorinated hydrocarbons include o-dichlorobenzene and polychlorinated polyphenyls (such as are marketed by Monsanto Chemical Co. under the trade mark "Aroclor").

The amount of the solvent is not critical except that it should provide a fluid reaction mass.

The proportions of cupric chloride to butadiene are not critical and may vary within relatively wide limits.

The reaction temperature will depend somewhat on the boiling point of the solvent being used. In general, practical temperatures range from about 100° C. to about 265° C. At temperatures below about 100° C. the reaction proceeds too slowly to be practical. There is usually no advantage in using temperatures above about 265° C. Most useful solvents boil below this temperature. Temperatures above the boiling point of the solvent may be used, but their use necessitates the employment of superatmospheric pressures. It is most convenient to use atmospheric pressure, although higher or lower pressures may be used.

The reaction should be carried out under essentially anhydrous conditions to avoid side reactions. By essentially anhydrous is meant that precautions are taken to exclude water from the reactants and the reaction system. The reaction should also be carried out in a system in which the sole reactive chlorine-yielding agent is the cupric chloride since the presence of other chlorine-yielding agents tends to alter the course of the reaction and produce undesired by-products.

In carrying out the process of the invention the cupric chloride is dissolved or suspended in the solvent and 1,3-butadiene is introduced into the reaction medium. The reaction may be carried out either by a batch or continuous method. The unreacted butadiene may be recycled to the system. In a continuous process it is desirable to provide for the regeneration of the cupric chloride by oxidation of the cuprous chloride formed. This may be done by conventional methods. The desired product, 1-chloro-1,3-butadiene, may be isolated by fractional distillation.

The chlorine-containing product resulting from this process is almost exclusively 1-chloro-1,3-butadiene with only traces of chlorobutenes and dichlorobutenes. Thus the product fraction boiling from 40–70° C. in a simple distillation assembly consists almost quantitatively (95–100%) of 1-chloro-1,3-butadiene.

1-chloro-1,3-butadiene may be polymerized alone or with other monomers. It may also be used as a starting material for other compounds. For example, it may be converted to a Grignard reagent, as described in U.S. Patent 3,083,242, and thus used for the preparation of a wide variety of organic compounds.

EXAMPLE I

Into a resin kettle, flushed with nitrogen, is introduced 500 ml. of distilled N,N-dimethylformamide and 57.1 g. of commercial anhydrous cupric chloride. The cupric chloride is added rapidly in a stream of nitrogen to ensure minimum contact with atmospheric moisture. The contents are heated to about 145–150° C. while nitrogen is bubbled through with stirring, to dissolve the cupric chloride. The butadiene is introduced through a sintered glass inlet tube at a rate of about 60–70 ml. per minute (at about 27° C. and atmospheric pressure) for 5 hours while maintaining the contents of the vessel at 145–150° C. Rapid stirring is maintained throughout the reaction. Products are trapped in a receiver and condenser which are cooled by a mixture of acetone and solid carbon dioxide (about −78° C.). Addition of butadiene is stopped and nitrogen is swept through the reaction mixture for about 10 minutes to sweep out any materials more volatile than the solvent. To the receiver, which contains about 70 ml. of colorless liquid, is added 5 ml. of ethyl ether. The receiver is allowed to warm to room temperature while butadiene is distilled into a Dewar trap cooled with a mixture of acetone and solid carbon dioxide. Much ether and high-boiling material are entrained with the butadiene. After distilling off most of the butadiene, 9.3 ml. of liquid remains in the first receiver. Five ml. of ether are added to the Dewar trap, and the contents of the trap are allowed to evaporate partially, leaving a residue of 4.5 ml. of liquid. The two residues are analyzed by gas chromatography on a Burrell "Kromo-Tog" instrument using a 250-cm. glass column packed with calcined diatomite aggregates having adsorbed thereon 20 percent by weight of polyethylene glycol having a molecular weight of 15,000–20,000 and a softening point of 50–55° C. The liquid product exclusive of ether and butadiene is found to contain 98.3% 1-chloro-1,3-butadiene, less than 0.5% of monochlorobutene, less than 0.1% chloroprene, and less than 0.5% dichlorobutene.

The quantity of 1-chloro-1,3-butadiene formed was estimated from the gas chromatographic data to be 0.022 mole.

From this figure the percent conversion based on cupric chloride is calculated to be 10.4% and on butadiene fed to the system is calculated to be 2.7%.

Since the reaction consumes 2 moles of cupric chloride, the percent conversion based on the cupric chloride present in the reaction system is calculated as follows:

Percent conversion =

$$\frac{\text{moles of 1-chloro-1,3-butadiene} \times 100}{1/2 \times \text{moles of CuCl}_2}$$

The percent conversion based on the amount of butadiene fed to the system is calculated as follows:

Percent conversion =

$$\frac{\text{moles of 1-chloro-1,3-butadiene} \times 100}{\text{moles of butadiene fed}}$$

The product from the above experiment is fractionally distilled to give ether, a forerun of boiling point 40–60° C. and 1.51 g. of the principal product having a boiling point of 66–68° C. and an index of refraction ($n_D^{25}$) 1.464. Literature constants for 1-chloro-1,3-butadiene are boiling point 66–68° C. and index of refraction ($n_D^{20}$) 1.4712. The principal product is refractionated through a micro spinning band column and a central cut gives the following analysis:

Calculated for $C_4H_5Cl$: C, 54.28%; H, 5.69%; Cl, 40.06%. Found: C, 54.5%, 54.7%; H, 6.4%, 6.3%; Cl, 39.5%, 39.4%.

The nuclear magnetic resonance spectrum of this purified sample indicates that it comprises 97.5% 1-chloro-1,3-butadiene and 2.5% ethyl ether.

Similar results are obtained when the experiment is repeated using one of the following materials (in which cupric chloride is not soluble or only slightly soluble) as the suspending medium and the reaction is carried out at the temperature shown:

| Solvent | Temp., °C. |
|---|---|
| o-Dichlorobenzene | 150 |
| Benzonitrile | 150 |
| Tetrachloroethylene | 115 |
| A mineral oil having a Saybolt viscosity at 37.8° C. of 369 and a specific gravity at 15.6° C. of 0.8836 | 200 |

EXAMPLES II–III

These experiments are carried out essentially as described in Example I except that the reaction vessel is a 250-ml. three-necked round-bottomed flask. The solvent is N,N-dimethylformamide (125 ml.). The temperature is maintained at about 150° C. Butadiene is fed at a rate of 40 ml./min. (27° C. and atmospheric pressure). The following table shows the data from the two runs:

| Example | II | III |
|---|---|---|
| Cupric chloride, g | 15.2 | 17.7 |
| Butadiene feed time, hours | 5 | 6 |
| Percent conversion based on CuCl$_2$ | 11.7 | 15.8 |
| Percent conversion based on butadiene fed | 1.3 | 1.8 |
| Composition of product mixtures, exclusive of ether, butadiene, and solvent, as estimated by gas chromatography: | | |
| 1-chloro-1,3-butadiene, percent | 97.1 | 99.0 |
| Chloroprene, percent | <0.1 | <0.1 |
| Monochlorobutenes, percent | <1.0 | <0.5 |
| Dichlorobutenes, percent | <1.0 | <0.5 |

EXAMPLE IV

This example is carried out in the same way as Examples II–III except that the solvent is N,N-dimethylacetamide (125 ml.), 12.2 grams of cupric chloride is introduced into the reaction vessel, the temperature is maintained at about 167° C. and butadiene is fed at the rate of 40 ml. per minute for five hours. The percent conversion, based on cupric chloride, is 1.6% and the fraction of product boiling at 40–70° C. is shown by gas chromatographic analysis to consist of 96 percent 1-chloro-1,3-butadiene.

Similar results are obtained when instead of N,N-dimethylacetamide the solvent used is a chlorinated polyphenyl compound having a specific gravity of about 1.538 (25° C./25° C.) and a distillation range of 365–390° C. (corr.). The reaction is carried out at 260–265° C. In this case, the cupric chloride is insoluble in this liquid medium and is therefore suspended in it as a fine dispersion.

What is claimed is:

1. A process for the preparation of 1-chloro-1,3-butadiene which comprises contacting and reacting butadiene and cupric chloride in the presence of an inert organic diluent which is liquid under the reaction conditions, under substantially anhydrous conditions, at a temperature in the range between about 100° C. and about 265° C., and recovering 1-chloro-1,3-butadiene from the reaction mixture, with the proviso that the said cupric chloride is the sole chlorine yielding agent and said inert organic diluent is one selected from:

(1) 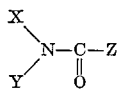

wherein X, Y and Z are H or a lower alkyl group containing 1 to 4 carbon atoms;

(2) 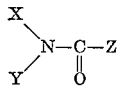

wherein X and Z together form an alkylene radical having from 3 to 5 carbon atoms and Y is H or a lower alkyl group containing 1 to 4 carbon atoms;

(3) lower dialkyl sulfones in which each alkyl group contains 1 to 4 carbon atoms;

(4) lower dialkyl sulfoxides in which each alkyl group contains 1 to 4 carbon atoms;

(5) cyclic alkylene sulfones containing 5 or 6 members in the ring;

(6) hexaalkylphosphoric triamides in which each alkyl group contains 1 to 4 carbon atoms;

(7) tetrachloroethylene;

(8) benzonitrile;

(9) chlorinated aromatic hydrocarbons; and

(10) mineral oils having a specific gravity of about 0.828 to about 0.905.

2. The process of claim 1 wherein the inert organic diluent is a solvent for said cupric chloride.

3. The process of claim 1 in which the inert organic diluent is N,N-dimethylformamide.

4. The process of claim 1 in which the inert organic diluent is N,N-dimethylacetamide.

References Cited

UNITED STATES PATENTS 3,061,653  10/1962  Stewart _____ 260—655

FOREIGN PATENTS 918,062  2/1963  Great Britain.

BERNARD HELFIN, *Primary Examiner.*

J. BOSKA, *Assistant Examiner.*